(12) United States Patent
Tian

(10) Patent No.: US 7,181,042 B2
(45) Date of Patent: *Feb. 20, 2007

(54) DIGITAL AUTHENTICATION WITH DIGITAL AND ANALOG DOCUMENTS

(75) Inventor: Jun Tian, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/683,560

(22) Filed: Oct. 9, 2003

(65) Prior Publication Data

US 2004/0264732 A1    Dec. 30, 2004

Related U.S. Application Data

(63) Continuation of application No. 09/689,293, filed on Oct. 11, 2000, now Pat. No. 6,683,966, which is a continuation-in-part of application No. 09/645,779, filed on Aug. 24, 2000, now Pat. No. 6,714,683.

(51) Int. Cl.
*G06K 9/00* (2006.01)
*G06K 9/36* (2006.01)

(52) U.S. Cl. .................... 382/100; 382/240
(58) Field of Classification Search ............... 382/100, 382/232, 240; 358/3.24

See application file for complete search history.

(56) References Cited

U.S. PATENT DOCUMENTS

| | | | |
|---|---|---|---|
| 5,505,494 A | 4/1996 | Belluci et al. | |
| 5,617,119 A | 4/1997 | Briggs et al. | |
| 5,636,292 A | 6/1997 | Rhoads | |
| 5,652,626 A | 7/1997 | Kawakami et al. | |
| 5,787,186 A | 7/1998 | Schroeder | |
| 5,799,092 A | 8/1998 | Kristol et al. | |
| 5,825,892 A | 10/1998 | Braudaway et al. | |
| 5,835,639 A | 11/1998 | Honsinger et al. | |

(Continued)

FOREIGN PATENT DOCUMENTS

EP    0891071    1/1999

(Continued)

OTHER PUBLICATIONS

U.S. Appl. No. 09/404,291, filed Sep. 23, 1999, Levy.

(Continued)

*Primary Examiner*—Duy M. Dang
(74) *Attorney, Agent, or Firm*—Digimarc Corporation

(57) ABSTRACT

A watermark embedder transforms a media signal from its perceptual domain to frequency domain regions and embeds a hash of data from one frequency domain region into a watermark in another frequency domain region. Alternatively, it encodes instances of the same message into the frequency domain regions. To detect alteration of the media signal, a watermark decoder transforms a suspect signal into the frequency domain regions, extracts the watermark message from a first frequency domain region and compares it with a reference derived from another frequency domain region. The reference signal is either a hash computed from the other frequency domain region of the watermarked signal, or another instance of the same message embedded into the other frequency domain region. The decoder can be used to detect alteration of the signal, such as alteration that occurs with reproduction (printing, scanning, copying, D/A-A/D conversion, etc.), compression, cropping or swapping of media signal content, etc.

22 Claims, 6 Drawing Sheets

U.S. PATENT DOCUMENTS

| | | | |
|---|---|---|---|
| 5,862,260 | A | 1/1999 | Rhoads |
| 5,912,972 | A | 6/1999 | Barton |
| 5,933,798 | A | 8/1999 | Linnartz |
| 5,943,422 | A | 8/1999 | Van Wie et al. |
| 6,005,936 | A | 12/1999 | Shimizu et al. |
| 6,024,287 | A | 2/2000 | Takai et al. |
| 6,064,764 | A | 5/2000 | Bhaskaran et al. |
| 6,101,602 | A | 8/2000 | Fridrich |
| 6,122,403 | A | 9/2000 | Rhoads |
| 6,226,387 | B1 | 5/2001 | Tewfik et al. |
| 6,243,480 | B1 | 6/2001 | Zhao et al. |
| 6,275,599 | B1 | 8/2001 | Adler |
| 6,285,775 | B1 | 9/2001 | Wu et al. |
| 6,292,092 | B1 | 9/2001 | Chow et al. |
| 6,321,981 | B1 | 11/2001 | Ray et al. |
| 6,332,030 | B1 | 12/2001 | Manjunath et al. |
| 6,332,031 | B1 | 12/2001 | Rhoads et al. |
| 6,385,329 | B1 | 5/2002 | Sharma |
| 6,487,301 | B1 * | 11/2002 | Zhao .................... 382/100 |
| 6,504,941 | B2 | 1/2003 | Wong |
| 6,683,966 | B1 * | 1/2004 | Tian et al. ............... 382/100 |
| 6,714,683 | B1 * | 3/2004 | Tian et al. ............... 382/240 |
| 6,748,533 | B1 | 6/2004 | Wu et al. |
| 6,751,336 | B2 * | 6/2004 | Zhao .................... 382/100 |
| 2002/0056041 | A1 | 5/2002 | Moskowitz |

FOREIGN PATENT DOCUMENTS

| | | |
|---|---|---|
| EP | 0953938 | 11/1999 |
| WO | WO00/33282 | 6/2000 |
| WO | WO00/75925 | 12/2000 |

OTHER PUBLICATIONS

Chae et al., "A Robust Embedded Data from Wavelet Coefficients", Department of Electrical and Computer Engineering, University of California.

Cooklev et al., "A Multiresolution Technique for Watermarking Digital Images", ICCE, Jun. 11-13, 1997, pp. 354-355.

Dugad et al., "A New Wavelet-Based Scheme for Watermarking Images", IEEE, Oct. 4-7, 1998, pp. 419-423.

Hsu et al., "Multiresolution Watermarking for Digital Images," IEEE Trans. on Circuits and Systems II: Analog and Digital Signal Processing, vol. 45, No. 8, pp. 1097-1101, Aug. 1998.

Inoue et al., "A Digital Watermark Method Using the Wavelet Transform for Video Data", IEICE Trans. Fundamentals, vol. E83-A, No. I, Jan. 2000, pp. 96.

Kim et al., "A Robust Wavelet-Based Digital Watermarking Using Level-Adaptive Thresholding", IEEE 1999, pp. 226-230.

Kim et al., "Wavelet Based Watermarking Method for Digital Images Using the Human Visual System", IEEE 1999, pp. 80-83.

Kundur et al., "A Robust Digital Image Watermarking Method Using Wavelet-Based Fusion," Int. Conf. on Image Proc., Oct. 1997, pp. 544-547.

Kundur et al., "Digital Watermarking for Telltale Tamper Proofing and Authentication", IEEE, vol. 87, No. 7, pp. 1167-1180.

Kundur et al., "Digital Watermarking Using Multiresolution Wavelet Decomposition," Proc. of 1998 IEEE Int. Conf. on Acoustics, Speech and Signal Processing, ICASSP '98, pp. 2969-2972, vol. 5.

Matsui et al., "Embedding a Signature to Pictures Under Wavelet Transformation," *Transactions of the Institute of Electronics Information and Communication Engineers D-II,* vol. J79D-11, No. 6, Jun. 1996, pp. 1017-1024.

Matsui et al., "Use of the Wavelet Transformation to Embed Signatures in Images," Systems and Computers in Japan, Jan. 1997, vol. 28, No. 1, pp. 87-91.

Meerwald et al., "A Survey of Wavelet-domain Watermarking Algorithms", *Security and Watermarking of Multimedia Contents III,* Jan. 2001, vol. 4314, pp. 505-516.

Onishi et al., "A Method of Watermarking with Multiresolution Analysis and Pseudo Noise Sequences," Systems and Computers in Japan, vol. 29, No. 5, pp. 11-19, May 1998.

Ohnishi et al., Embedding a Seal into a Picture Under Orthogonal Wavelet Transform, Proceedings of MULTIMEDIA '96, 1996, IEEE, pp. 514-521.

Pereira et al., "Optimized Wavelet Domain Watermark Embedding Strategy Using Linear Programming", SPIE AeroSense 2000: Wavelet Applications, Apr. 2000.

Swanson et al., "Multiresolution Scene-Based Video Watermarking Using Perceptual Models," IEEE Journal on Selected Areas in Communications, May 1998, vol. 16, No. 4, pp. 540-550.

Swanson et al., "Multiresolution Video Watermarking Using Perceptual Models and Scene Segmentation," Proc. Int. Conf. on Image Processing, vol. 2, pp. 558-561, Oct. 1997.

Tsekeridou et al., "Embedding self-similar watermarks in the wavelet domain," Proceeding of the IEEE ICASSP 2000, Jun. 2000, pp. 1967-1970.

Tsekeridou et al., "Wavelet-Based Self-Similar Watermarking for Still Images", 2000 IEEE International Symposium on Circuits and Systems, Emerging Technologies for the 21$^{st}$ Century, pp. 220-223.

Wang et al., "Wavelet Based Digital Image Watermarking," Optics Express, vol. 3, No. 12, pp. 491-495, Dec. 7, 1998.

Wei et al., "Perceptual Digital Watermark of Images Using Wavelet Transform," IEEE Transactions on Consumer Electronics, vol. 44, No. 4, pp. 1267-1272, Nov. 1998.

Xie et al., "Joint Wavelet Compression and Authentication Watermarking", ICIP, Oct. 4-7, 1998, pp. 427-431.

Zhu et al., "Multiresolution Watermarking for Images and Video", IEEE Transactions on Circuits and Systems for Video Technology, vol. 9, No. 4, Jun. 1999, pp. 545-550.

* cited by examiner

Exhibit A

Image Block FFT

DIGITAL AUTHENTICATION WITH DIGITAL AND ANALOG DOCUMENTS

RELATED APPLICATION DATA

This patent application is a continuation of U.S. patent application Ser. No. 09/689,293, filed Oct. 11, 2000 (now U.S. Pat. No. 6,683,966). The 09/689,293 application is a continuation in part of U.S. patent application Ser. No. 09/645,779, filed Aug. 24, 2000 (now U.S. Pat. No. 6,714,683). Each of these patent documents is hereby incorporated by reference.

The subject matter of the present application is related to that disclosed in U.S. Pat. No. 5,862,260, and in application Ser. No. 09/503,881, filed Feb. 14, 2000 (now U.S. Pat. No. 6,614,914); which are hereby incorporated by reference.

TECHNICAL FIELD

The invention relates to steganography, and in particular relates to hiding data in media objects such as images, video and audio.

BACKGROUND AND SUMMARY

Steganography refers to a process of hiding information in other information. One form of steganography is digital watermarking. Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other transform domain (e.g., Fourier, Discrete Cosine, Wavelet Transform domains). The reading component analyzes target content to detect whether a watermark is present. In applications where the watermark encodes information (e.g., a message), the reader extracts this information from the detected watermark.

The present assignee's work in steganography, data hiding and watermarking is reflected in U.S. Pat. No. 5,862,260; in application Ser. Nos. 09/503,881 (now U.S. Pat. No. 6,614,914) and Ser. No. 09/452,023 (now U.S. Pat. No. 6,408,082); and in published specifications WO 9953428 and WO0007356 (corresponding to U.S. Ser. No. 09/074,034, now U.S. Pat. No. 6,449,377, and Ser. No. 09/127,502, now U.S. Pat. No. 6,345,104). One application of watermarks, sometimes referred to as fragile or semi-fragile watermarking, is to detect alteration of media signal. Some of assignee's work in this area is reflected in co-pending application Ser. No. 09/234,780, filed Jan. 2, 1999, Ser. No. 09/498,223, filed Feb. 3, 2000 (now U.S. Pat. No. 6,574,350); 60/198,138, filed Apr. 17, 2000, Ser. No. 09/574,726, filed May 18, 2000, Ser. No. 09/618,948, filed Jul. 19, 2000 (now U.S. Pat. No. 6,385,329), Ser. No. 09/625,577, filed Jul. 25, 2000, and Ser. No. 09/645,779, filed Aug. 24, 2000.

A great many other approaches are familiar to those skilled in the art. The artisan is presumed to be familiar with the full range of literature about steganography, data hiding and watermarking.

The invention provides methods and systems for embedding and decoding watermarks in frequency domain regions of media signals, such as image, audio and video signals. One aspect of the invention is a method for embedding auxiliary information in a media signal such that the auxiliary information is substantially imperceptible. The method transforms the media signal into frequency transform regions, calculates a hash of the media signal in one frequency transform region, and embeds the hash into a watermark in another frequency transform region. In a compatible watermark decoder, the hash is extracted and compared with a recalculated hash to detect signal alteration, and identify the location and type of alteration.

Another aspect of the invention is a method of decoding a message signal that has been embedded in a media signal such that the message signal is substantially imperceptible in a perceptual domain of the media signal. The method transforms the media signal from a perceptual domain to frequency domain regions, where each region includes a set of frequency coefficients within a frequency range. It then decodes a watermark message from at least one of the regions, and compares the watermark message with a reference derived from another frequency domain region to determine alteration of the media signal. The reference may be a hash of the frequency domain region from which it is derived, another instance of the watermark message, or some other reference signal.

Another aspect of the invention is a watermark decoder. The decoder comprises a frequency domain transform operator for transforming the media signal from a perceptual domain to frequency domain regions, where each region includes a set of coefficients within a frequency range. It also has a message decoder for decoding a message signal having two or more elements from at least one of the frequency domain regions. The decoder is operable to compare the message signal with a reference signal derived from a frequency domain region different than the region or regions from which the message signal is decoded to detect alteration of the media signal.

This document describes a variety of implementation details and applications of watermark embedders and decoders. In addition to the message signal, for example, the embedder may also encode an orientation signal to synchronize the decoder with the embedded signal in a distorted version of the watermarked signal.

The watermark system may be used in a variety of applications, including robustly carrying metadata or links to metadata, and to detect alterations of the watermarked signal, such as alterations due to printing, scanning, compression, etc. The watermark may be used to detect alteration by evaluating changes to instances of a message signal decoded from a host media signal. In one application for example, a watermark decoder evaluates changes in a watermark message signal relative to a reference message signal. The reference may be the original message signal embedded in the host media signal, instances of the message signal decoded from different parts of the media signal (e.g., different subbands), or a combination of both. In addition, the watermark may be used to carry authentication information, such as a hash of the host signal, that is used to detect alteration. The watermark decoder compares the hash extracted from the watermark with a hash re-computed from the host signal to detect alteration. The decoder may also use the extent and nature of the detected alteration to distinguish among different types of alterations, such as those due to printing, scanning, compression, etc.

Further features will become apparent with reference to the following detailed description and accompanying drawings.

DETAILED DESCRIPTION

Introduction

The following sections describe wavelet based watermark technologies. The first section describes an embedding function for encoding auxiliary information in the wavelet domain of a media object, such as image signal. The next section describes a compatible watermark decoding function. Subsequent sections describe extensions and applications of these wavelet based watermark encoding and decoding functions.

Watermark Encoding

Figure 1:
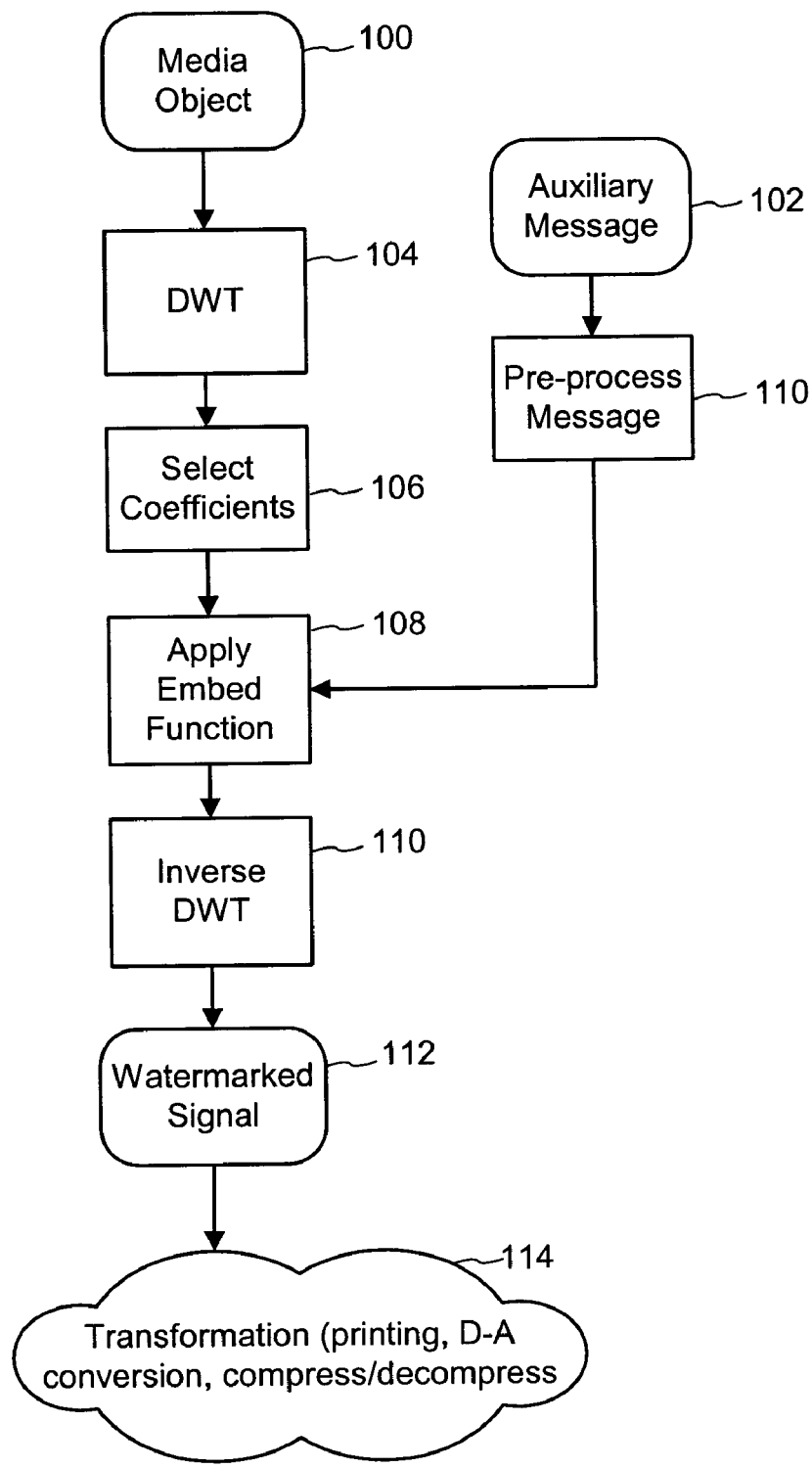
FIG. 1 is a flow diagram illustrating a wavelet based watermark encoding method.

FIG. 1 is a flow diagram illustrating a wavelet based watermark encoding method. The inputs to the encoder include a media object 100, such as a two-dimensional image, and an auxiliary message 102 to be hidden in the object. This method applies to a variety of media types (e.g., audio, video, etc.), but for the sake of illustration, is described for the case of an image signal. The image signal is a two dimensional array of sample values. For this implementation, the watermark is embedded in the luminance channel, but may be embedded in other color channels as well.

Figure 2:
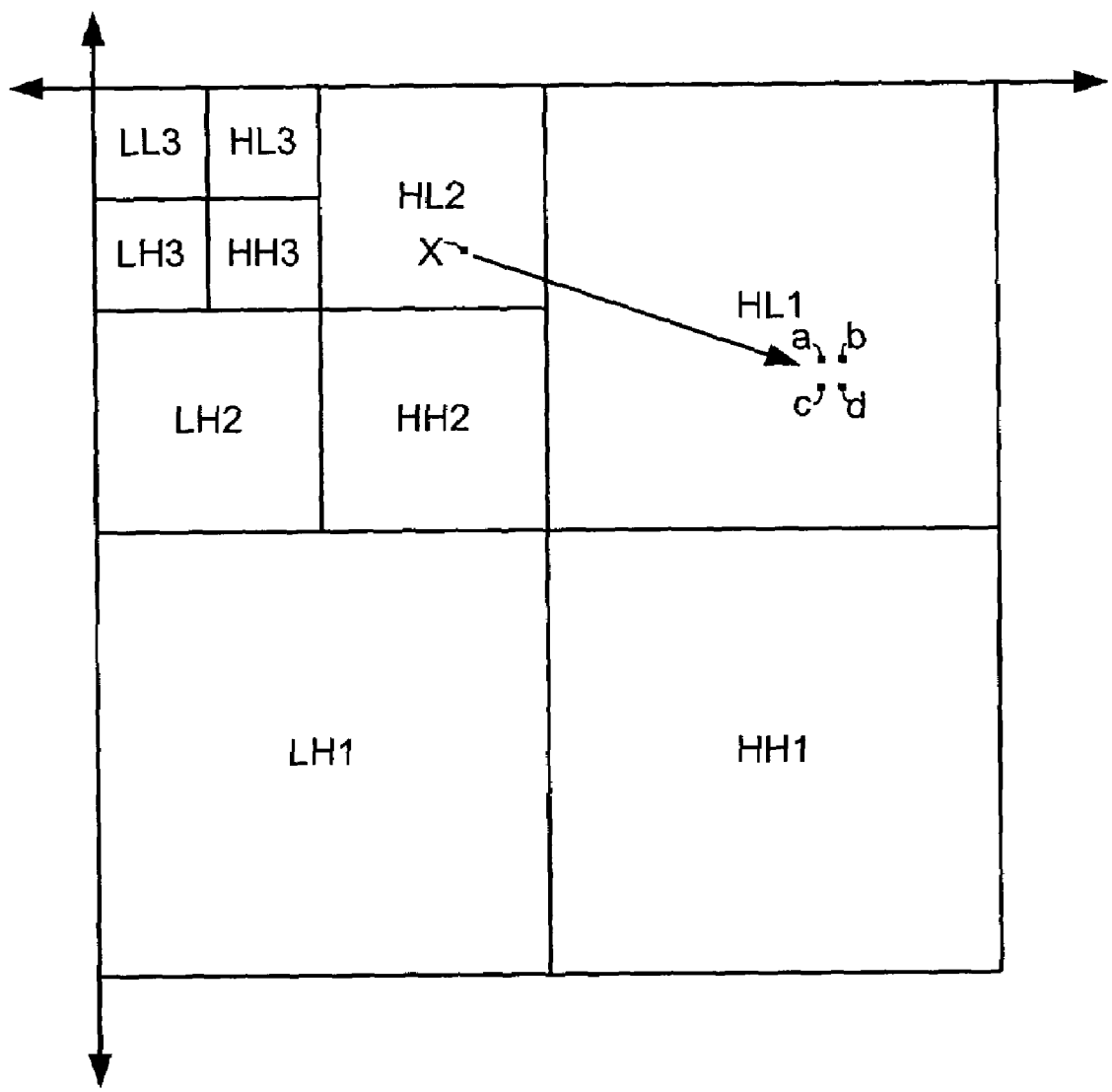
FIG. 2 illustrates an example of a decomposition of a two dimensional signal into subbands.

The encoder begins by computing a discrete wavelet transform of the image (104). The wavelet transform decomposes the image signal into multiple levels of resolution. There are several types of wavelet transforms that may be selected for a particular implementation, such as orthogonal (like Haar, Daubechies), biorthogonal, multiwavelet, wavelet packet, and smooth wavelets (like Symlet, Morlet, Mexican Hat, and Meyer). A current implementation of the method depicted in FIG. 1 employs a Cohen-Daubechies-Feauveau 7/9 taps biorthogonal discrete wavelet transform, but other types of wavelet transforms may be used as well. FIG. 2 shows an example of a wavelet transform of a two-dimensional signal such as a still image. This example has three levels of decomposition. The highest to the lowest levels of resolution are numbered from 1 to 3, and LL3 is a low resolution version of the original image (referred to as the approximate band). Beside the lowest level, LL3, each of the other levels includes three bands (also referred to as "subbands"): HL representing coefficients of signals oriented in the vertical direction, LH representing coefficients or signals oriented in the horizontal direction, and HH representing coefficients of signals oriented in the diagonal direction.

After transforming the image, the encoder may optionally evaluate coefficients to select a subset for embedding elements of an auxiliary message (106). Alternatively, the encoder may simply select all coefficients in certain bands for encoding the auxiliary message.

Each discrete element of a binary message signal is mapped to a group of wavelet coefficients. In this implementation for example, each element maps to four coefficients in a given band. One way to select the coefficients is to define an ordering of the wavelet coefficients, select the N largest magnitude coefficients of a particular band, and then modify children coefficients of each of the N coefficients. To illustrate the concept of children coefficients, FIG. 2 shows an example of a parent coefficient X in a subband (HL2), and corresponding four children a, b, c, d at the same relative spatial location in the next, higher resolution level (HL1) in the wavelet decomposition.

In this particular encoder, the auxiliary message signal is a binary-valued signal, comprising a sequence of values of $\{1,-1\}$. The sequence is represented as $s=(s_1, s_2, \ldots, s_M)$, where M is the message length.

The encoder embeds elements of the message sequence into corresponding coefficients by applying an embedding function to these coefficients (108). Specifically, the embedding function encodes an element of the message by modulating edge information represented in neighboring coefficients. In particular, each message element may be encoded by modulating the relative values of neighboring coefficients in a given subband, taking into account the direction of the edges in that subband.

An example of this type of edge feature embedding function is as follows:

1. If the coefficients a, b, c, d reside in a HL subband, then the encoder modifies the children such that:

$$\|a\|-\|c\|-\|b\|-\|d\|=s_i w_i$$

where $w_i$ is the watermark strength.

2. If the coefficients a, b, c, d reside in a LH subband, then the encoder modifies the children such that:

$$\|a\|-\|b\|-\|c\|-\|d\|=s_i w_i$$

where $w_i$ is the watermark strength.

3. If the coefficients a, b, c, d reside in a HH subband, then the encoder modifies the children such that:

$$\|a\|-\|d\|-\|b\|-\|c\|=s_i w_i$$

where $w_i$ is the watermark strength.

HL, LH and HH subbands represent vertical, horizontal, and diagonal edge information, respectively. The above embedding function exploits this edge information by modulating the differences of neighboring coefficients in the direction of the edges in the subband.

As an alternative to embedding a message in coefficients selected by magnitude, the encoder may encode the message in groups of coefficients that encompass all of the samples in a given subband or set of subbands. For example, each two by two block of samples in a subband or selected subbands may be used to encode an element of the binary message signal. In one alternative implementation, for example, the encoder embeds a message signal in the LH3, and HL3 subbands. In this implementation, the encoder subdivides the entire LH3 and HL3 subbands into contiguous two by two blocks of coefficients and then applies the embedding function described above to encode a message signal.

In some applications, the number of elements in the message signal is less than the number of groups of coefficients that each encode a single element of the message signal. In such cases, the message (or portions of it) can be repeated and then embedded using all of the available coefficients in the selected bands for carrying the message.

Another variation of the above encoding method is to sub-divide the host signal into segments and then encode a watermark signal in each segment. For example, in one implementation for images, the encoder sub-divides the image into N by N blocks, and then performs a DWT process, coefficient selection and embedding function on each block. Level 1 has N/2 by N/2 coefficient samples in each subband, Level 2 has N/4 by N/4 coefficients in each subband, etc. Since there are three subbands per level in the wavelet decomposed image, a message of length M can be repeated in each level the following number of times:

$$\frac{(N)^2 \times 3}{4^{L+1} M},$$

where L is the level of resolution and each element of the watermark message is encoded in a two by two block of coefficients as described above.

Referring again to FIG. 1, the encoder may perform one or more pre-processing operations (110) on an auxiliary message to place it in a form for embedding into the host signal. Some examples of pre-processing steps include: appending control symbols (e.g., a known message string that may be used to verify that a valid message is present and to synchronize or calibrate a watermark decoder with the embedded message string); adding error detection symbols; performing error correction encoding (BCH, Reed Solomon, Convolution codes), spread spectrum modulation (e.g., repeating the message and spreading it over a pseudorandom sequence using a spreading function such as XOR or multiplication), and other symbol encoding processes (M sequences, gold sequences, etc.). The result of these pre-processing operations may be expressed in a binary form as noted above.

After applying the embedding function to embed the message signal, the encoder performs an inverse DWT (110) on the decomposed signal to generate a watermarked signal 112.

At this stage, the watermarked signal is perceptually similar to the original, un-watermarked original media object. The degree of imperceptibility of the watermark may be increased at the expense of watermark signal strength and/or message capacity. After being watermarked, the media object may be subjected to various transformations (114) as a result of malicious attack or routine processing such as digital to analog—analog to digital conversion (e.g., printing, display, playback, image capture, audio signal sampling, etc.), compression/decompression, geometric distortion, up sampling, down sampling, subsequent watermarking, time scale modifications (for temporal signals), etc. As detailed further below, the watermark may be designed to withstand certain types of transformations. In some cases, the watermark may be designed to degrade in predictable ways in response to certain types of transformations, such as scanning, printing or compression so that such transformations can be detected.

In some applications, the watermarked signal may be subjected to various types of distortion, including geometric transformation. As such, it is useful to incorporate features into the watermark that enable the decoder to detect the watermark in a signal suspected of containing a watermark and to determine its orientation parameters, such as its origin (translation), rotation, scale, affine transform parameters, shear, differential scale, etc. One such feature is a watermark synchronization signal or orientation signal. One example is an orientation signal that is expressed as a collection of impulse or "delta" functions in the Fourier magnitude domain having pseudorandom phase. Various forms of correlation operations may be used to detect the orientation signal and determine its orientation parameters as disclosed in U.S. Pat. No. 5,862,260, and in application Ser. No. 09/503,881, filed Feb. 14, 2000 (now U.S. Pat. No. 6,614,914); which is incorporated by reference. For example, a decoder may correlate a reference orientation signal with a signal suspected of containing a watermark. The amount of correlation can be used to determine whether the watermark is likely present. The resulting orientation parameters may be used to align the watermarked signal to approximate the geometric position of the signal at the time of encoding. Then, the decoder may extract the auxiliary message from the re-aligned signal data.

In one implementation, for example, the encoder subdivides an image into blocks and uses the above encoding method to embed an auxiliary message in selected subbands. The encoder then adds an orientation signal to each block. In particular, the encoder adds the spatial domain image signal representing the watermark orientation signal to the image block after embedding the message signal to it. To reduce the visibility of the orientation signal, the encoder may apply a perceptual mask to the watermark orientation signal before adding it to the watermarked image block.

Watermark Decoding

Figure 3:
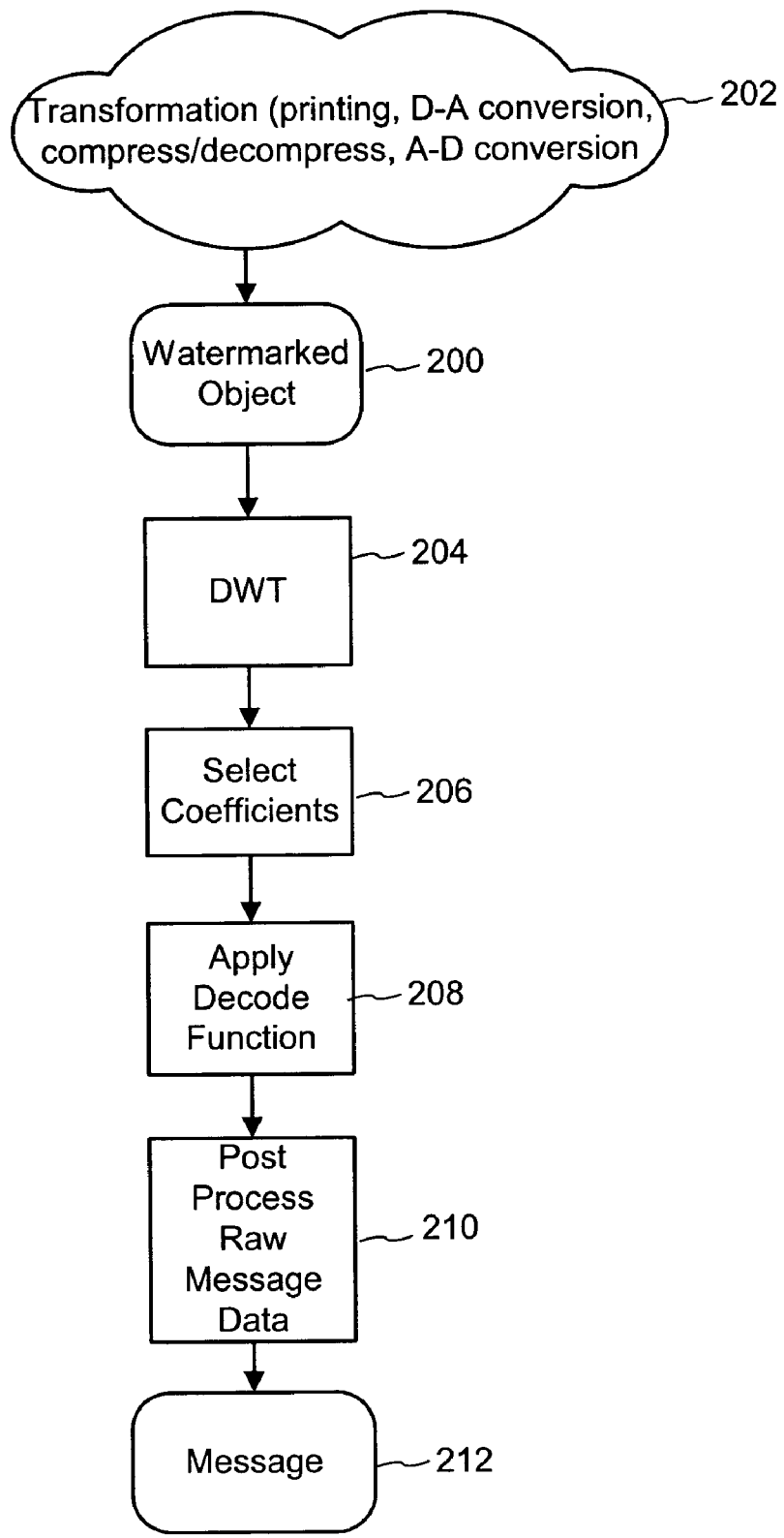
FIG. 3 is a flow diagram illustrating a method for decoding a watermark that is compatible with the encoding method of FIG. 1.

FIG. 3 is a flow diagram illustrating a method for decoding a watermark that is compatible with the encoding method of FIG. 1. As noted above, a watermarked object 200 typically undergoes some form of transformation 202. In some image applications (including still image and video), the watermarked image may remain in the digital domain, yet undergo compression/decompression, scaling, cropping, etc. In other applications, the watermarked image may undergo various phases of printing and scanning. Watermarked audio signals may undergo analogous transformations. For the sake of illustration, this section describes implementation details of a watermark decoder for image watermark applications.

The watermark decoder in this example operates on digital images. Before decoding begins, an imaging system (digital camera, scanner, etc.) captures a digital image of the watermarked object in cases where the watermarked object is in analog form (printed on paper, card, label, packaging or other object). To decode the watermark, the decoder performs a DWT 204 on the digital image. In some implementations, the decoder may apply various pre-processing steps, such as down-sampling or up-sampling the image, converting it to a selected color channel (e.g., luminance), dividing it into blocks, etc. If the watermark encoder selectively embedded a message signal into certain coefficients or subbands, the decoder selects these coefficients or subbands (206).

The decoder then applies a decode function (208) to extract an estimate of the message element encoded in wavelet coefficients. For example, in the embedding function described above, the encoder embedded an element of the message signal in a group of neighboring coefficients. The decoder identifies this group and evaluates the embedding function using the coefficient values in the group. It repeats this process for each group of coefficients to compute an estimate of the binary value of the message element embedded in the group. This decoding process produces a set of raw message data.

As noted in the previous section, the message signal may be the result of various pre-processing operations, such as error correction coding, spread spectrum modulation, adding error detection information, etc. The decoder performs compatible demodulation, error correction decoding, etc. (210) to reconstruct a message (212). It may then output the message or take some other action associated with the message.

Applications

The watermark encoding and decoding methods and systems described above may be employed in a variety of applications. Some applications include counterfeit deterrence, object identification and tracking, usage control (e.g., used to control file transfer, rendering, editing or copying), carrying metadata such as related information or machine instructions, and carrying references or links to information, programs, actions, etc. (linking the object to a network resource such as a web page at a web server).

In these and other applications, the watermark may be designed to be fragile or semi-fragile, or have two or more components, some of which are fragile or semi-fragile, and some that are not. "Fragile" in the context of watermark applications generally refers to an attribute of a watermark in which the watermark degrades in response to certain transformations. For example, if a watermarked image is compressed, cropped or subjected to transformations inherent in certain types image scanning and printing operations, the watermark is degraded or removed. Similarly, in audio watermarks, compression, cropping, digital to analog— analog to digital conversion, etc. may degrade or remove a fragile watermark. The absence of the watermark, or the inability to detect the watermark above certain thresholds, indicates that the watermarked signal has undergone some form of transformation. The decoder may measure the degradation by identifying portion of the signal where a known message cannot be recovered or where a known watermark signal (such as the synchronization or orientation signal) cannot be detected.

In cases where the watermark signal extends across the host signal, the degradation or absence of the watermark can be isolated to specific spatial and or temporal locations within the watermarked signal, and these locations can be tracked and presented to a user as being manipulated subsequent to the watermark encoding process. Examples of ways to embed the watermark signal throughout the host signal is to replicate the watermark in blocks of the host signal or its transform coefficients as noted above.

A semi-fragile watermark has properties that survive certain forms of manipulation, yet does not survive others. One way to implement the semi-fragile watermark is to give the watermark signal attributes that survive certain forms of manipulation and attributes that degrade or do not survive other forms of manipulation. In some implementations, different components of the watermark may degrade differently. By measuring degradation of each component, and then comparing the result, the decoder can evaluate the extent or type of degradation that the watermark signal has undergone. These different components may be separate watermarks that are coextensive or at least partially overlap each other, or embedded in distinct parts of the host signal (e.g., interleaved in different coefficients, bands, resolution levels, temporal or spatial segments, etc.).

Another way to implement the semi-fragile watermark is to embed the watermark robustly to survive expected transformations and include a signal dependent message. This signal dependent message should preferably be insensitive to changes due to the watermarking process, yet should be able to indicate reliably other expected forms of degradation. For example, the message may include a hash of the host signal. The decoder extracts the hash from the watermark message and also re-computes it for the watermarked signal (optionally after re-aligning the signal using the orientation parameters calculated in a watermark detection process). By comparing the decoded hash with the re-computed hash, the decoder can assess whether degradation has occurred and the extent of degradation.

In certain applications, such as where watermarks are placed on physical objects, it is desirable for the watermark to serve multiple functions, such as carrying metadata or a reference to metadata, as well as detect forgery or counterfeiting of the object. In such applications, the watermark needs to carry the metadata robustly to survive printing on the object, soiling or tearing of the object, and then scanning of the degraded object.

The above watermark methods and those in the documents incorporated by reference can be used to carry information in an imperceptible or nearly imperceptible watermark that is robust to common transformations, such as printing, scanning, soiling, tearing, geometric distortion, etc. In addition, these methods may be used to encode and evaluate fragile and semi-fragile watermarks. The remainder of this section describes some example implementations.

One approach for detecting transformation of a watermark signal is to compare parts of the watermark signal decoded in the same or different subbands at a wavelet decomposition level or between levels. Consider an example where a host signal is divided into segments. If the message length M is selected so that the same message may be repeatedly encoded within a level and at different levels, then the watermark decoder can compare the messages decoded from within a given level and at different levels. If the messages decoded from one level are similar within certain tolerances, yet are different from the messages decoded from another level, then the results of the decoding indicate that some alteration has occurred and identify the levels of the decomposition where this alteration has occurred. The decoder may also make comparisons with the original message to assess the extent of the alteration, and the location in the spatial, temporal, or frequency domain where the alteration occurred.

Consider an example where a message of length M is embedded repeatedly in different levels of decomposition in each of several blocks of an image using the embedding function described above. Since the number of coefficients decreases with decreasing level of resolution, the number of messages that may be repeated in each level of decomposition decreases. Nevertheless, the messages decoded from each level can be compared with each other, and with messages of different levels. Assume a 128 by 128 sample image block size, a 48 bit message, and groups of two by two coefficients carrying a single bit of information. The message can be repeated 64 times at level 1, 16 times at level 2, 4 times at level 3, and 1 time at level 4 of the wavelet decomposition. For each level, there is at least one instance of the watermark message $W_{i,j}$, where i represents the level of decomposition and j the instance of the watermark message. To check for degradation of the watermark, the decoder compares corresponding instances of the message from different levels, and also compares instances of the message within a given level. If differences in the messages exceed a threshold, the decoder can identify such differences and associate them with known types of transformations that cause such differences.

The decoder may be tuned to detect certain types of alterations based on characterizations of alterations that commonly occur. For example, commercially available printers and scanners may introduce certain types of noise and distortion that can be characterized in terms of their changes to a media signal and the watermark signal embedded in it. Specifically, printers and scanners introduce resampling, aliasing, and/or low pass filtering transformations on the power spectrum of an image. To detect processing by commercial grade scanners and printers, these transformations are characterized in terms of the effect that they have on an image signal and on the watermark signal. These transformations are characterized in a manner that distinguishes them from transformations introduced by a higher quality, forensic grade image scanner.

The watermark decoder then evaluates whether these effects are present in the image and watermark signals derived from a forensic grade scanned image of a watermarked object. The watermark decoder produces evaluation results that indicate whether a watermarked object (document, card, label, etc.) has been copied based on characterization of the transformations that typically occur when objects are copied on common using common reproduction devices, such as copiers, printers, scanners, etc. The watermark decoder can trigger any of a number of actions in response to detecting a form of alteration or degradation that corresponds to a characterized transformation, such as displaying an indicator of the alteration, indicating where the alteration occurred (e.g., which image block or blocks), displaying the possible types of alteration that occurred (e.g., cropping, commercial grade scanning or printing, etc.), recording a record of the detected alteration (e.g., user and device identifier and address data to covertly trace unauthorized use by user and device), inhibiting use, rendering, or transfer of the watermarked signal, etc.

While the previous example is described in the context of watermarked images on physical objects, similar methods apply to other applications, such as detecting compression of image, video or audio signals based on a characterization of the degradation due to compression on the media signal and the watermark embedded in it. For example, a watermark decoder based on the technology described above detects compression of the watermarked signal by evaluating changes in instances of an embedded message signal at different subbands.

Another way to evaluate alterations to a signal is to encode host signal dependent information into the watermark message. For example, a hash of the host signal may be embedded in the watermark message. To detect alteration of the host signal after watermarking it, a decoder extracts the message and the hash, re-computes the hash for the image, and compares the hash values. If the hash values differ by an amount that exceeds some threshold ranging from zero to some other predetermined amount, then the decoder returns a result indicating that an alteration has occurred. This result may specify the extent of the alteration and the location of the alteration within the watermarked signal.

The hash operation should be insensitive to certain types of alterations, such as those due to the watermark itself. In addition, in applications where the watermark is used on physical objects like documents, the hash should be insensitive to high quality printing that places the watermarked image on the physical object and to forensic scanning used to create a suspect image for evaluation of the watermark.

One method of computing the hash is to compute the hash from watermarked wavelet coefficients in one level of resolution or subband, and then insert the hash as a message in the watermark message embedded in another level of resolution. This can be repeated in two or more bands of the wavelet decomposition. By computing the hash on watermarked coefficients in this manner, the watermark embedding process will not adversely impact the hash value. The decoder evaluates the hash by first watermark decoding it from one band and then recomputing the hash from the coefficients in the band from which it was originally derived. If the hash values differ by more than a threshold, the decoder returns a result indicating that an alteration occurred. Additionally, it can indicate where the alteration was detected (e.g., in which band). If the wavelet based watermark is replicated in blocks or segments of the host signal (e.g., each block or segment is separately wavelet decomposed and watermarked), then the detected alteration can be isolated to the block or segment in which it was detected.

The location of the alteration can then be graphically depicted to the user on the display of a watermark decoder system, such as programmed computer or special purpose forensic analysis tool. For example, a watermarked image can be displayed with altered regions in different colors. The extent of the alteration can be color coded so that more severe alterations are distinguishable from less severe ones.

The watermark embedding function described above counters certain types of attacks because it is dependent on the host media signal. In particular, the embedding function modulates edge feature information represented in the relative values of selected groups of neighboring wavelet coefficients. Since these edge features vary from one signal to another, it is difficult to copy the watermark from one host signal to another.

More on Using Watermarks and Embedded Hashes to Detect Signal Alteration

Figure 4:
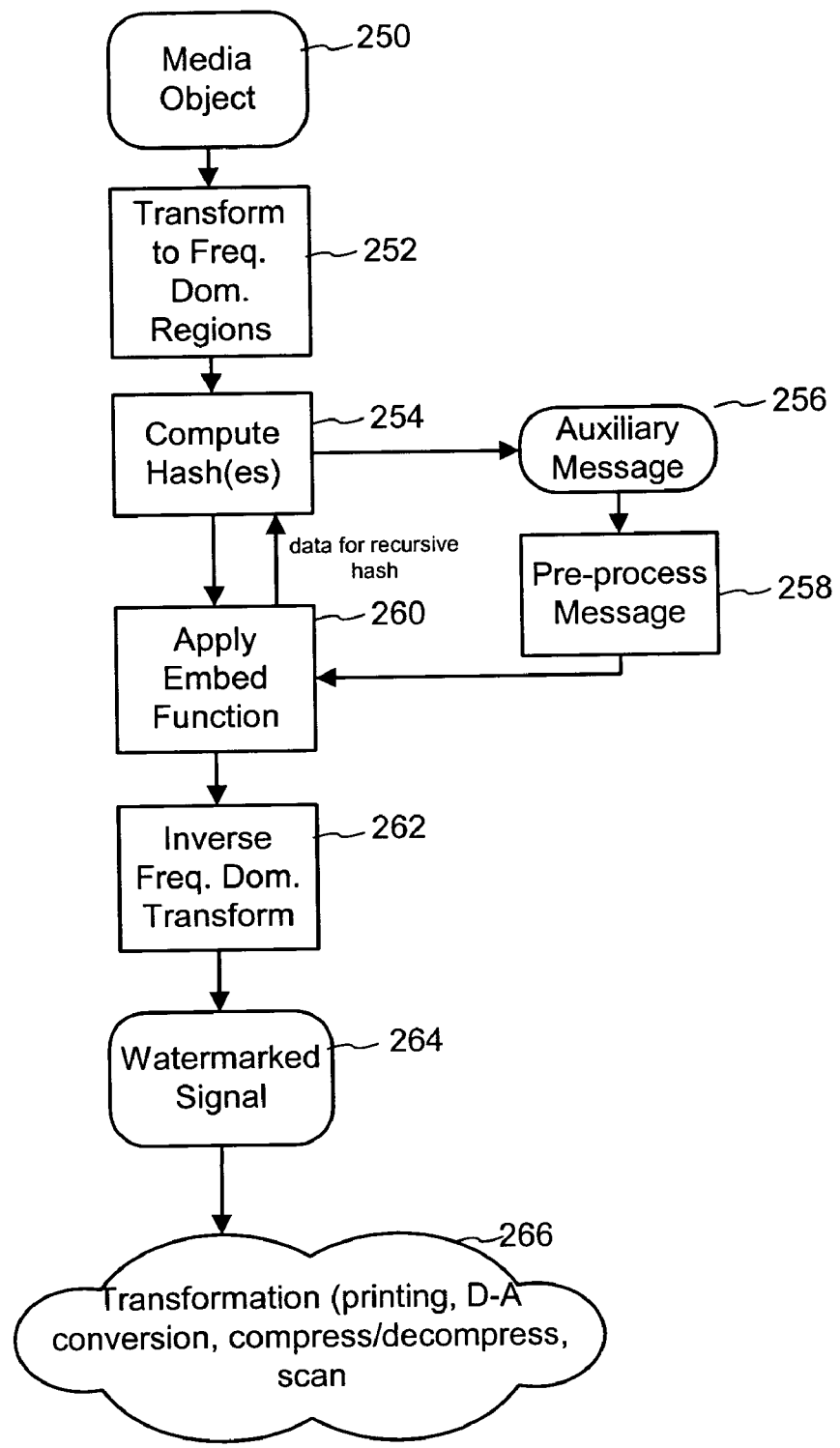
FIG. 4 is a flow diagram illustrating a method of embedding an authentication watermark into frequency domain regions of a media signal.

FIG. 4 is a flow diagram illustrating a method of embedding an authentication watermark into frequency domain regions of a media signal. The method starts with a media object (250) such as an image, video or audio signal, and transforms it into frequency domain regions (252). To illustrate the process, we use an example of an image transformed into a frequency domain using a Fast Fourier Transform (FFT). A similar method may be implemented for other signal types and frequency transforms.

In this implementation, a watermark encoder operates on blocks of the image, preferably 128 by 128 pixel blocks or larger, and repeats the embedding process on each block. While this implementation operates on the luminance channel of the image, the same process may be performed in other color channels, or on separate color channels (e.g., one watermark in a first color channel such as luminance, and a second watermark in a color channel orthogonal to the first, such as chrominance). The FFT transforms each image block into FFT coefficients in a Fourier domain. The encoder separates the FFT coefficients into two or more regions, such as those shown in FIG. 5.

Figure 5:
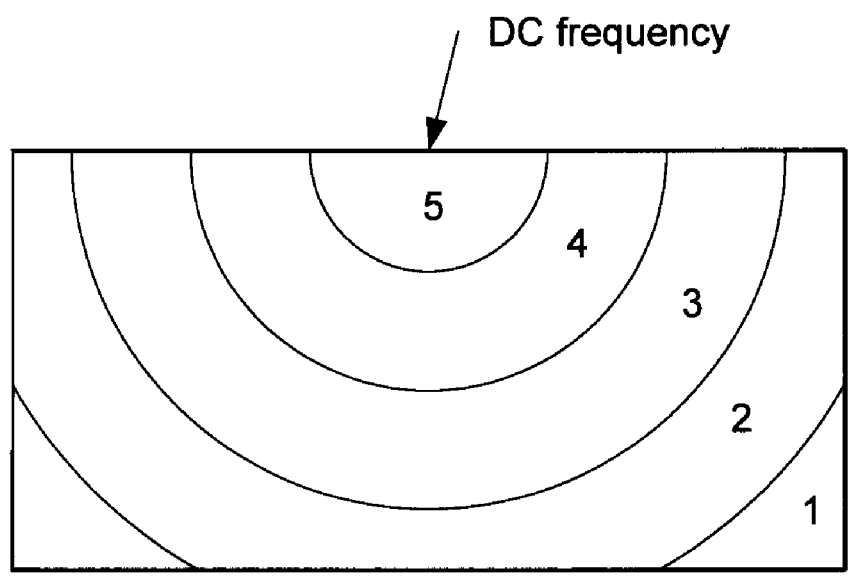
FIG. 5 shows an example of how to subdivide frequency coefficients into regions for watermark embedding and decoding.

For a given application, the implementer selects the regions according to the expected robustness of each FFT coefficient to degradation by the type of image attack which is to be detected. In one application, the robustness of an FFT coefficient to an attack varies inversely with the frequency of the FFT coefficient (where frequency is considered the distance of the coefficient from the DC, or zero frequency, coefficient). In this case, a possible division of the coefficients into four or five regions is shown in FIG. 5.

To detect alteration of a watermarked signal, this method compares a reference signal derived from a first region with a watermark message embedded in a second frequency domain region. One form of reference signal is a hash of the first region. In this case, the hash of the first region is embedded in the second region. The watermark encoder performs the process of calculating the hash in one region and embedding it in another recursively. Specifically, it calculates a hash function of region 1 (see FIG. 5), and embeds it in region 2. It then calculates a hash function of region 2, and embeds it in region 3, and so on, until a hash of region N−1 is calculated and embedded in region N.

There are a variety of different types of hash calculations that may be used for this type of application. One type of hash is to perform uniform quantization of the frequency coefficients in a frequency domain region of interest and then compute an average of the quantized coefficients as the hash value.

A related form of hash calculation is to apply a uniform quantizer on a set of coefficients in a frequency domain region and then apply a cryptographic hash function to the quantized coefficients. If any of the quantized values of the suspect signal are different than the quantized values of the original watermarked signal then the calculated hash function value will be different than the value embedded in the watermark. The hash embedded into the watermark should be about 12 to 16 bits to minimize the likelihood of similar quantized values hashing to the same hash value. In order to encode this message into a region of an FFT transformed image block, the embedder preferably employs a 256 by 256 or 512 by 512 FFT on image blocks of 256 by 256 or 512 by 512 pixels, respectively.

As shown in FIG. 4, the process of computing the hash from the frequency coefficients (e.g., FFT coefficients) in one region (254) generates an auxiliary message (256). The watermark encoder performs message preprocessing, such as error correction coding, error detection coding, and spread spectrum modulation (258). A watermark embedding function then computes and embeds the watermark signal (260). The embedding function may be by any of a variety of watermark embedding methods. In this implementation, the embedding function takes elements of an antipodal spread spectrum watermark signal and adjusts corresponding coefficients of the FFT region up or down based on the value of the elements of the watermark signal. To adapt the watermark signal to the host image, the encoder adjusts the value of the elements of the watermark signal based on a perceptual analysis of the host signal and then adds the result to the corresponding frequency coefficients.

In recursive embedding, the watermarked coefficients from one region form the input to calculate the hash to be embedded in the next region.

To return the signal to the perceptual domain, the encoder performs an inverse frequency domain transform (262). In this case, this process is an inverse FFT. As an alternative to directly embedding coefficients in the frequency domain, the encoder can calculate the watermark signal in the frequency domain, inverse transform the watermark signal to the perceptual domain, and then add it to the host signal in the perceptual domain.

The watermark embedding process can make the watermark robust to geometric distortion by adding a watermark orientation signal. The compatible decoder uses this orientation signal to compute the rotation, scale and translation of the image after watermark embedding, and uses these orientation parameters to align the image data before decoding the embedded watermark message from each region. To avoid interference with the watermark message signal, the orientation signal can be designed to modify frequency coefficients that are distinct from the coefficients modified to encode the message signal. Alternatively, the orientation signal can act as the carrier signal of the watermark message, which is modulated to carry the watermark message.

The result of the embedding process is a watermarked signal (264). After watermarking, the watermarked signal may undergo various types of manipulations and transformations through typical process or malicious attack. These include printing, scanning, photocopying, digital to analog and analog to digital conversion (D-A, A-D) compression and decompression, scanning, etc.

A related approach to using a hash as a reference by which alteration is detected is to embed the same or related watermark in two or more frequency domain regions. In this case, the reference is an instance of the watermark to which another instance may be compared. The decoder detects and measures alteration of the watermark signal by measuring the differences between the watermark signals extracted from the different regions. There are a number of variations to this approach. For example, a watermark message in one region can be used to specify a decoding key for a watermark embedded in another region. The key may specify attributes of the watermark signal, such as which frequency coefficients it modifies and how it modifies them. The watermark message payload in one region may be used to carry a decryption key used to decrypt the message payload in another region. For example, the payload in one watermark may be related to the payload in another watermark in a different region by a cryptographic function, such as a cryptographic hash. In cases where the watermarks in different regions are related (but not the same), the decoder can use this known relationship to compare the watermarks and detect alteration.

Figure 6:
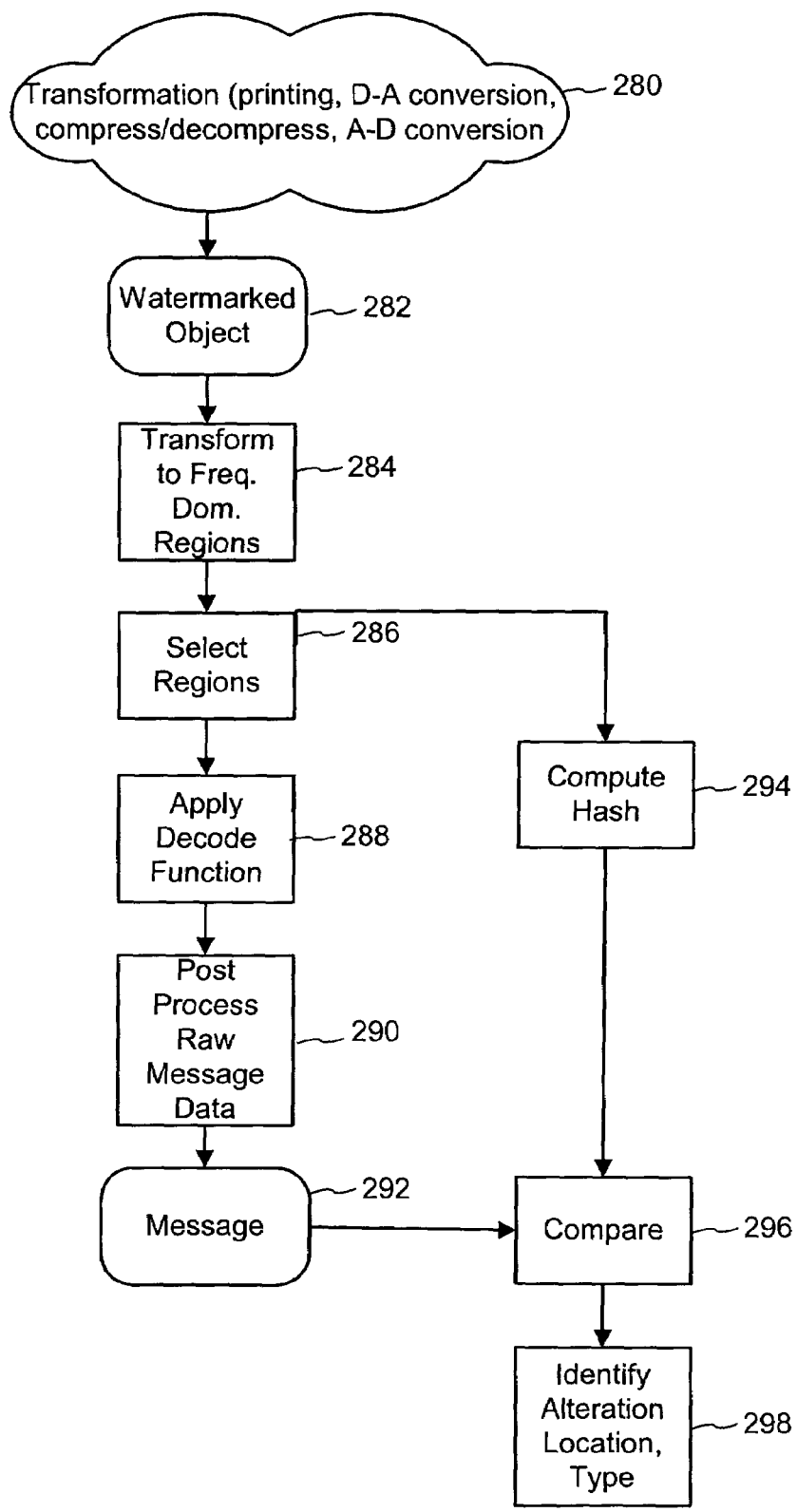
FIG. 6 is a flow diagram of a method of decoding watermarks from frequency domain regions and using the watermark payload to evaluate alteration of a watermarked media signal.

FIG. 6 is a flow diagram of a method of decoding watermarks from frequency domain regions and using the watermark payload to evaluate alteration of a watermarked media signal. As noted previously, the watermarked signal may undergo several types of transformation after the embedding process, including printing, scanning, and photocopying (for images), D-A, A-D conversion, compression, decompression, etc. (280). A watermark decoder captures a watermarked object (282), a digital representation of the watermarked signal. For our running example, the object is an image, but it may also be an audio or video signal.

A frequency domain transform (in this case an FFT) transforms blocks of the signal into a frequency domain and assigns the frequency coefficients into the regions used in the embedder (284). If the signal is likely to undergo geometric distortion, the watermark decoder uses the watermark orientation signal embedded in the signal to compute the original orientation (e.g., rotation, scale and translation of an image, or translation and scale of an audio signal) of the watermarked signal, and realign the data so that it approximates the original orientation. After realigning a block of data, the decoder performs the frequency domain transform on the realigned data.

Next, the watermark decoder applies the decode function to extract the watermarks from the selected frequency domain regions (288). For a spread spectrum watermark, the decoder correlates the coefficients with a pseudorandom carrier signal to demodulate raw watermark message data. Then, post-processing of the raw message data reveals the original message (290, 292), including any hash values. In particular, additional error correction decoding produces the original message signal, which may be further verified using error detection codes in the message.

Next, the decoder selects the regions for which a hash has been embedded, and recomputes the hash from the frequency region for which the hash was computed (294). If two or more hashes were embedded, the decoder computes each of these hash values from the appropriate frequency domain regions.

To detect alteration, the decoder compares the decoded message data with reference data (296). This reference data may include a hash computed from a corresponding frequency domain region, a watermark message from another region, or both. If the extracted message values do not match their corresponding reference values or more generally, are not within a predefined tolerance, then the decoder notes the corresponding frequency domain region where it found this discrepancy. The decoder repeats this process for blocks throughout the watermarked signal, noting the frequency region and location of the discrepancies.

Based on the frequency region or regions of detected alteration, the decoder maps the detected alteration to a type of alteration, such as printing, scanning, or compression. The type of alterations to be detected are characterized in terms of their degradation to the watermark in certain frequency regions. This characterization is represented in a table or other logic that translates detected alterations to a type of alteration. The location and type of alteration may be conveyed to the user by displaying the watermarked signal, along with a graphical indicator showing the block location and type of alteration.

In addition, the detection of an alteration may trigger actions, such as recording forensic tracer data about the user (such as a user ID, device ID, computer address), sending the tracer data and an identifier of the watermarked signal to a monitoring device or database over a communication network like the Internet, controlling rendering actions on the watermarked signal (preventing playback, recording, file transfer, etc.), further degrading the watermarked signal to render it unusable, linking the decoding device to a web site associated with the identifier of the watermarked signal for more information, or opportunities to acquire rights to render or transfer the watermarked signal, etc. The identifier of the watermarked signal may be decoded from a watermark in the signal or taken from a file metadata, like a file header or footer.

CONCLUDING REMARKS

Having described and illustrated the principles of the technology with reference to specific implementations, it will be recognized that the technology can be implemented in many other, different, forms. In addition, it can be used in many different applications, including linking media signals to metadata and actions (e.g., watermark payload that carries a direct or indirect link to information, a device, or program), carrying hidden information secretly and imperceptibly in audio, video or image signals, controlling rendering, use, or transfer of the media signal in which a watermark is embedded, detecting alteration or copying of a watermarked physical or electronic object, etc. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or special purpose digital circuitry. Similarly, auxiliary data decoding may be implemented in software, firmware, hardware, or combinations of software, firmware and hardware. The methods and processes described above may be implemented in software or firmware programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. Apparatus which authenticates a digital representation of an object, the digital representation including frequency components and the apparatus comprising:
    an apparatus component which uses first information in at least a first frequency component of the frequency components to produce first authentication information; and
    an incorporator which incorporates the first authentication information into at least a second frequency component of the frequency components that is separate from the first frequency component.

2. The apparatus set forth in claim 1 wherein:
the frequency components are coefficient values that represent significant frequency components that are computed by a perception model.

3. The apparatus set forth in claim 2 wherein:
the perception model is an auditory perception model.

4. The apparatus set forth in claim 2 wherein:
the perception model is a visual perception model.

5. The apparatus set forth in claim 1 wherein:
the frequency components are contained in DCT blocks.

6. The apparatus set forth in claim 1 wherein:
the first authentication information is a digital signature.

7. The apparatus set forth in claim 1 wherein:
the first authentication information is a secure hash code.

8. The apparatus set forth in claim 1 wherein:
the first authentication information is a cryptographic code.

9. The apparatus set forth in claim 1 wherein:
the first authentication information is a hash code.

10. The apparatus of claim 1 wherein the apparatus component comprises instructions executed by electronic processing circuitry.

11. The apparatus of claim 1 wherein the apparatus component comprises at least electronic processing circuitry.

12. The apparatus of claim 1 wherein the apparatus component comprises at least a machine-readable medium comprising instructions stored thereon to use the first information in the first frequency components to produce the first authentication information.

13. The apparatus of claim 1 wherein the apparatus component comprises at least one component from a group comprising at least firmware, hardware, instructions executing on digital circuitry, and a computer readable medium comprising executable instructions stored thereon.

14. A method comprising:
receiving digital data representing an object, wherein the digital data comprises a plurality of frequency components;
producing first authentication information from at least a first frequency component of the plurality of frequency components; and
incorporating the first authentication information into at least a second frequency component of the plurality of frequency components, wherein the second frequency component and the first frequency component are separate frequency components.

15. The method of claim 14 where the first authentication information comprises a digital signature.

16. The method of claim 14 where the first authentication information comprises a secure hash code.

17. The method of claim 14 where the first authentication information comprises a cryptographic code.

18. The method of claim 14 where the first authentication information comprises a hash code.

19. A machine-readable medium comprising instructions to execute the method of claim 14.

20. The method of claim 14 where the frequency components are coefficient values that represent significant frequency components that are computed by a perception model.

21. The method of claim 20 where the perception model is an auditory perception model.

22. The method of claim 20 where the perception model is a visual perception model.

* * * * *